(12) United States Patent
Stojanovic et al.

(10) Patent No.: US 12,041,415 B2
(45) Date of Patent: Jul. 16, 2024

(54) APPARATUS FOR SOUND DETECTION, SOUND LOCALIZATION AND BEAM FORMING AND METHOD OF PRODUCING SUCH APPARATUS

(71) Applicant: ams International AG, Jona (CH)

(72) Inventors: Goran Stojanovic, Rapperswill (CH); Jens Hofrichter, Horgen (CH); Thomas Stockmeier, Premstätten (AT)

(73) Assignee: AMS INTERNATIONAL AG, Jona (CH)

( * ) Notice: Subject to any disclaimer, the term of this patent is extended or adjusted under 35 U.S.C. 154(b) by 175 days.

(21) Appl. No.: 17/907,325

(22) PCT Filed: Mar. 19, 2021

(86) PCT No.: PCT/EP2021/057134
§ 371 (c)(1),
(2) Date: Sep. 26, 2022

(87) PCT Pub. No.: WO2021/191086
PCT Pub. Date: Sep. 30, 2021

(65) Prior Publication Data
US 2023/0113962 A1     Apr. 13, 2023

(30) Foreign Application Priority Data
Mar. 27, 2020   (EP) ..................... 20166393

(51) Int. Cl.
*H04R 1/40*       (2006.01)
*H04R 3/00*       (2006.01)

(52) U.S. Cl.
CPC ............. *H04R 1/406* (2013.01); *H04R 3/005* (2013.01); *H04R 2201/003* (2013.01); *H04R 2430/23* (2013.01)

(58) Field of Classification Search
CPC ......... B81B 3/00; H04M 1/02; H04M 1/0266; H04M 1/03; H04M 1/60; H04M 1/6008;
(Continued)

(56) References Cited

U.S. PATENT DOCUMENTS 7,944,130 B2   5/2011   Park et al.
8,611,565 B2   12/2013  Currano et al.
(Continued)

FOREIGN PATENT DOCUMENTS

CN      103416043 A      11/2013
JP      2001298784 A     10/2001
(Continued)

OTHER PUBLICATIONS

Taiwan Office Action issued in Taiwan Patent Application No. 110111142 dated Oct. 12, 2023, with English language translation, 14 pages.
(Continued)

*Primary Examiner* — Harry S Hong
(74) *Attorney, Agent, or Firm* — MH2 TECHNOLOGY LAW GROUP LLP (57) ABSTRACT

An apparatus for sound detection, sound localization and beam forming comprises a display and a plurality of microphone stacks, wherein the display surrounds each microphone stack in lateral directions. The apparatus further comprises a plurality of elastic connectors, wherein each elastic connector surrounds one respective microphone stack in lateral direction and mechanically connects the respective microphone stack with the display. Each microphone stack further comprises a microelectromechanical transducer array, the transducer array comprising a plurality of membranes, in particular nano-membranes, and corresponding integrated back-volumes, the back-volumes being arranged under the membranes. An optical reading device is config-
(Continued)

ured to separately detect the displacement of each membrane.

14 Claims, 7 Drawing Sheets

(58) Field of Classification Search
CPC . H04R 1/24; H04R 1/245; H04R 1/28; H04R 1/2892; H04R 1/40; H04R 1/406; H04R 3/00; H04R 3/005; H04R 23/00; H04R 23/008; H04R 31/00; H04R 31/006; H04R 2201/003; H04R 2430/23; H04R 2499/11
USPC .......................................... 381/92, 95, 122
See application file for complete search history.

(56) References Cited

U.S. PATENT DOCUMENTS

| | | | |
|---|---|---|---|
| 9,516,428 B2 | 12/2016 | Dehe et al. | |
| 9,716,944 B2 | 7/2017 | Yliaho et al. | |
| 2003/0007656 A1 | 1/2003 | Verweg | |
| 2007/0165896 A1 | 7/2007 | Miles et al. | |
| 2008/0240471 A1 | 10/2008 | Chen et al. | |
| 2012/0268513 A1* | 10/2012 | Huffman | B41J 2/14427 347/54 |
| 2014/0225205 A1* | 8/2014 | Zoellin | B81B 3/00 257/416 |
| 2014/0226838 A1 | 8/2014 | Wingate et al. | |
| 2015/0350792 A1* | 12/2015 | Grosh | H10N 30/306 257/416 |
| 2015/0365770 A1 | 12/2015 | Lautenschlager | |
| 2016/0165341 A1 | 6/2016 | Benattar | |
| 2017/0150255 A1 | 5/2017 | Wang et al. | |
| 2018/0075867 A1 | 3/2018 | Dahl et al. | |
| 2019/0208317 A1 | 7/2019 | Woodruff et al. | |
| 2020/0336841 A1* | 10/2020 | Zeleznik | H04R 3/00 |

FOREIGN PATENT DOCUMENTS

| | | | |
|---|---|---|---|
| JP | 2005203944 A | 7/2005 | |
| JP | 2006186792 A | 7/2006 | |
| WO | 2009154981 A2 | 12/2009 | |
| WO | 2012129247 A2 | 9/2012 | |

OTHER PUBLICATIONS

European Communication under Rule 71(3) EPC issued in European Patent Application No. 20 166 393.7 dated Dec. 4, 2023, 59 pages.
Christensen et al., "Technical Review No. 1 Beamforming", Bruel & Kjaer, 2004, 54 pages.
Eargle, "The Microphone Book", Elsevier, Second Edition, 2005, 391 pages.
Fahy et al., "Advanced Applications in Acoustics, Noise and Vibration", Spon Press, 2004, 655 pages.
Flanangan, "Computer-steered microphone arrays for sound transduction in large rooms", The Journal of the Acoustical Society of America, No. 78, vol. 1508, 1985, 12 pages.
Hofrichter et al., "Synthesis of Graphene on Silicon Dioxide by a Solid Carbon Source", NANO Letters, 7 pages.
Olson, "Acoustical Engineering", D. Van Nostrand Company, Inc., 1960, 737 pages.
Schomburg, "Introduction to Microsystem Design", RWTH edition, Springer, 2011, 342 pages.
Fachado, Ramano, A (EP Authorized Officer), International Search Report and Written Opinion in corresponding International Application No. PCT/EP2021/057134 mailed on Apr. 12, 2021, 18 pages.

* cited by examiner

APPARATUS FOR SOUND DETECTION, SOUND LOCALIZATION AND BEAM FORMING AND METHOD OF PRODUCING SUCH APPARATUS

CROSS-REFERENCE TO RELATED APPLICATIONS

The present application is the national stage entry of International Patent Application No. PCT/EP2021/057134, filed on Mar. 19, 2021, and published as WO 2021/191086 A1 on Sep. 30, 2021, which claims the benefit of priority of European Patent Application No. 20166393.7, filed on Mar. 27, 2020, all of which are incorporated by reference herein in their entireties.

FIELD OF THE INVENTION

The present disclosure relates to an apparatus for sound detection, sound localization and beam forming, an electronic device; and a method for producing an apparatus for sound detection, sound localization and beam forming.

BACKGROUND OF THE INVENTION

Microphone arrays with discrete microphones have been used in various applications, for example to achieve directionality, sound localization and beam forming. For sound localization and beamforming a diversity of methods can be provided, ranging from evaluation of cross- and auto-correlation function to delay-and-sum or track-while-scan algorithms while considering sound signals in far field and near field.

For a good spatial resolution an ideal microphone array should have a large aperture (dimension of the whole array), as the Rayleigh criterion for resolution states that $\theta = \sin^{-1}(1.22 \cdot \lambda/D)$, where $\theta$ is the minimum angle between two sources to be detected, D is the size of a linear aperture and $\lambda$, is the wavelength of the sound pressure wave. This means that small apertures will not have a good directionality at lower frequencies.

On the other hand, an array with a large aperture and a small number of transducers suffers from loss of directionality at higher frequencies, which is known as side lobes. For a one-dimensional array with N equidistantly spaced transducers this can be derived from the spatial Fourier transform (also known as pattern function) of the array's aperture function.

In this case, the pattern function can be written as $$w(k) = \frac{\sin\left(\frac{N \cdot d \cdot k}{2} \cdot \sin \varphi\right)}{N \cdot \sin\left(\frac{d \cdot k}{2} \cdot \sin \varphi\right)},$$

where, $k = 2\pi/\lambda = \omega/c_0$ is the acoustic wavenumber associated with a plane wave having phase speed $c_0$, d is the distance of neighboring transducers, $\lambda$, is the wavelength and $\varphi$ is the angle of the wave impinging the one-dimensional array of transducers. The pattern function w(k) is a periodic function of k. In addition to the main lobe at k=0, the pattern function exhibits repetitions of the main lobe at positions $k = p \cdot (2\pi/d)$, $p = \pm 1, \pm 2, \ldots$. Provided that d is less than one half of an acoustic wavelength, then the directional response of the array is dominated by the main lobe. However, once d exceeds $\lambda/2$, 'spatial aliasing' occurs and significant side-lobes are produced in the response of the array. This means that in order to achieve the requirements for a maximum frequency the distance between transducers in the array has to be smaller than half of the sound wavelength for that frequency. These requirements however require a large aperture and a lot of transducers.

For beam forming algorithms it should be noted that an array of transducers can be steered to be selective to sound impinging from a direction $\varphi_0$, provided an appropriate weighting function is applied to the transducers of the array to ensure that their net outputs add coherently for the arrival angle $\varphi_0$. In this case, the pattern function can be written as $$w(k) = \frac{\sin\left(\frac{N \cdot d \cdot k}{2} \cdot (\sin \varphi - \sin \varphi_0)\right)}{N \cdot \sin\left(\frac{d \cdot k}{2} \cdot (\sin \varphi - \sin \varphi_0)\right)},$$

which corresponds to a shift of the spatial Fourier transform with a resulting main lobe centered on the desired angle (N.

Capacitive microelectromechanical (MEMS) microphones have been used as discrete components to form sensor arrays, which can have linear, rectangular or circular shapes. However, such arrays require the use of separate microphones that can be costly. Besides, capacitive MEMS microphones used as discrete components in the array need to expose each transducer to the sound field, which requires substantial space and volume. Capacitive MEMS microphone arrays with integrated transducers require very complicated supply and sensing schemes due to the reading method for the membrane displacement. As each microphone has to work as a separate transducer in the array, acoustic requirements for the back-volume in each transducer can take some substantial volume, too.

It is an objective to provide an apparatus for sound detection, sound localization and beam forming, which can be implemented within a reduced volume. It is further an objective to provide a method of producing an apparatus for sound detection, sound localization and beam forming, which can be implemented within a reduced volume.

This objective is achieved with the independent claims. Further embodiments and variants derive from dependent claims. The definitions as described above also apply to the following description unless otherwise stated.

SUMMARY OF THE INVENTION

In an embodiment an apparatus for sound detection, sound localization and beam forming comprises a display, the display having a main plane of extension. The display can be the display of any electronic device, for example of a mobile device, such as a cell phone, for instance. The display can comprise any material known for construction of such a display. In at least the visible spectrum of wavelengths the display may be transparent to electromagnetic radiation. With respect to the main plane of extension of the display, the display may be plain, i.e., not curved.

The apparatus further comprises a plurality of microphone stacks, wherein the display surrounds each microphone stack in lateral directions. The lateral directions extend parallel to the main plane of extension of the display. This means that the respective microphone stack is inserted into a gap within the display. However, a slit separates the display and the inserted microphone stack. Thus, the display and the microphone stack are not in direct mechanical contact. The number of microphone stacks is arbitrary and depends on the application. For example, the apparatus comprises at least two microphone stacks.

The apparatus further comprises a plurality of elastic connectors, wherein each elastic connector surrounds one respective microphone stack in lateral directions and mechanically connects the respective microphone stack with the display. This means that each elastic connector is in mechanical contact both with the display and with a respective microphone stack. Each elastic connector can surround one respective microphone stack completely in lateral directions. Each elastic connector may comprise any material with a low value for its Young's modulus in comparison with the Young's modulus for the materials used for the display. This means, the elastic material is less stiff than the materials of the display. For example, the elastic layer may comprise silicone. The elastic layer can form a ring, which spans the slit between the display and the microphone stack.

The microphone stack comprises a microelectromechanical transducer array, the transducer array comprising a plurality of membranes and corresponding integrated back-volumes. The transducer array extends in a direction which is parallel to the main plane of extension of the display. The membranes may be integrated on a substrate, in particular a semiconductor substrate, for example comprising silicon (Si). Furthermore, the membranes may comprise a material, which is compatible with a semiconductor process, for example silicon-nitride (SiN) or polycrystalline silicon. However, the membranes can also comprise a two-dimensional material (2D material) such as graphene or molybdenum-disulfide (MoS2) or any other material suited to form nano-membranes. The two-dimensional material shall exhibit a single atomic layer as the thickness. However, also other thicknesses can be contemplated. In one embodiment, the thickness of the 2D material is two atomic layers. Yet, also a larger number of atomic layers is feasible, such as 10 for instance.

The back-volumes are arranged in a transversal direction under the membranes. The transversal direction extends perpendicular to the main plane of extension of the display.

This means that the back-volumes are formed by the volume under the membranes. The back-volume can further be formed by cavities in the substrate, which supports the membranes. The back-volume can be filled with air or gas.

The microelectromechanical transducer array comprises at least two microelectromechanical transducers, which are arranged to each other in a regular or irregular way. By way of example, four transducers can be arranged on a rectangular grid. Each transducer is configured to convert a sound pressure wave into a mechanical deflection of the membrane, which in turn can be converted into an electronic signal by means of a reading method. The back-volume is configured to provide an acoustic compliance. The response of a membrane to sound pressure waves, especially at audio frequencies, depends on the size of the back-volume. This means that the back-volume should be as large as possible in order to increase the sensitivity as well as the signal-to-noise ratio (SNR) of the transducer.

The microphone stack further comprises an optical reading device configured to separately detect the displacement of each membrane within the transducer array. This means that each transducer within the transducer array forms an optical microphone. An optical microphone evaluates the response of a membrane to sound by use of an optical method. For example, the optical reading device can comprise at least one light source and a photo detector. The light source may be a laser, LED or other light source with a controlled coherence length. When a mirror is integrated on the membrane, vibrations can be detected by use of a laser beam and an interferometer, i.e., movements of the membrane can be detected by changes in the optical path length of the reflected laser beam. An interferometer may be used to transfer the associated phase change into an intensity change of the optical signal. The optical reading device detects the displacement of each single transducer within the transducer array separately.

Due to the small size of MEMS transducer arrays, they can be installed in devices of limited size and volume, such as in mobile devices and smartphone displays. By means of the optical reading method the transducers can be even smaller in lateral directions and thinner in height. The integrated back-volumes provide enough acoustic compliance even for membranes with small diameter.

Even with the transducers of one single transducer array good directionality and spatial resolution of incoming sound waves at as low as possible audio frequencies can be achieved, preferably down to 10 kHz. Besides, using multiple membranes within one transducer array increases the SNR by a factor of $10 \cdot \log(N)$, where N is the number of membranes in the transducer array.

By combining more than one transducer array, sound localization and beam forming can be done even at low frequencies, preferably down to 1 kHz.

Installing the transducer arrays by using elastic connectors exposes each membrane directly to the sound pressure. The elastic connector reduces structure borne sound transmission from the display to the transducer array.

In an embodiment each microphone stack further comprises an elastic layer. The elastic layer may comprise any material with a low value for its Young's modulus in comparison with the Young's modulus of the material used for the display. For example, the elastic layer can comprise a nano-material. For example, the elastic layer can be carbon and form a carbon nano-membrane. In another example the nano-membrane may be made from molybdenum-disulphide. Since the elastic layer is the topmost layer of the microphone stack, it is connected to the environment above the display. The elastic layer may be robust in order to withstand environmental impacts and external forces like touching. However, the elastic layer also functions as a membrane and is capable to become deflected in transversal directions. This way, the elastic layer transfers sound pressure waves towards the transducer array.

In this embodiment each microphone stack further comprises a gasket, wherein in the transversal direction the gasket is arranged between the elastic layer and the transducer array. The gasket has a first surface and a second surface opposite to the first surface. The gasket is in mechanical contact with the transducer array via the first surface as well as with the elastic layer via the second surface. Additionally, the gasket comprises a plurality of through-holes penetrating the gasket. This means that the trough-holes connect the first surface with the second surface of the gasket. The membranes of the transducer array are aligned with the through-holes of the gasket. The alignment is done in such a way that the through-holes are located in the transversal direction above the membranes. Thus, the gasket separates the sound pressure for each membrane. The volume enclosed by the membrane, the through-hole and the elastic layer is referred to as front-volume. The front volume can be filled with air or gas and is sealed by the gasket. The gasket may comprise a material which is as rigid as possible in terms of its Young's modulus. By way of example, the gasket comprises Si or glass.

By providing an elastic layer and a gasket above the transducer array the sensitive membranes of the transducer array are protected against environmental impacts and external forces like touching. This is because the membranes are located within the apparatus and spaced from the display by the gasket. Due to the flexibility of the elastic layer and its membrane function above each through-hole sound pressure waves impinging the elastic layer can be forwarded towards the membranes in the transducer array. Due to this protective arrangement the transducer array can be fabricated by conventional MEMS technologies and standard MEMS materials can be used. For example, the membranes comprise SiN.

In another embodiment each microphone stack further comprises a 2D material layer as topmost layer, wherein the membranes of the transducer array are formed from respective portions of the 2D material layer. This means that each membrane comprises a 2D material. In this embodiment, the membranes are directly exposed to the environment above the display. Thus, there is no need for the elastic layer or the gasket. The 2D material layer can comprise carbon (resulting in graphene when the thickness is an atomic layer) or molybdenum-disulphide (MoS2), by way of example. However, any other material suitable to form nano-membranes can be used. The 2D material layer can comprise several atomic layers of the corresponding material. For example, the 2D material layer can be thin and only comprise one or two atomic layers. However, thick 2D material layers, which correspond to several tens of atomic layers, are possible, too. The overall thickness, i.e. the number of atomic layers is arbitrary and depends on the application. The respective material, the thickness as well as the geometrical setup of the 2D material layer affect the dependency of the membrane displacement on the pressure.

By using 2D materials such as graphene or MoS2 for the membrane and due to the 2D material properties such as Young's modulus, density etc., smaller membrane diameters can be achieved. Thus, even with a small aperture of the transducer array, the membranes can have a larger spacing between them. On this way, even single transducer arrays can have a good directionality and spatial resolution at low frequencies, for example down to 10 kHz. Membranes comprising 2D materials are more resistant to environmental impacts, so they can be exposed directly to the environment.

In an embodiment each transducer array further comprises a substrate arranged in a transversal direction under the plurality of membranes. The substrate may comprise a semiconductor material, for example Si. A thin-film may be arranged on top of the substrate and the membranes may be formed by portions of the thin-film. Cavities are formed in the substrate under respective portions of the thin-film, so that the thin-film is exposed on a side facing the substrate. Portions of the thin-film, which are exposed, form the membranes. Membranes can be plane or corrugated.

The back-volume is formed by the cavity in the substrate under the respective membrane. This way, the back-volume is integrated in the substrate. The back-volume can be filled with gas or air. For example, the back-volume may be filled with nitrogen.

By using substrates, in particular semiconductor substrates, conventional processes like deposition and etching techniques can be used to fabricate transducer devices. Moreover, additional functional components like circuits, sensors, electrical connections etc. can be integrated in the substrate. Since the back-volumes are integrated in the substrate, the transducer arrays can be very compact, which allows further miniaturization of the device.

In an embodiment the transducer array further comprises vent holes connecting each back-volume with the environment. The vent holes are formed by openings in the substrate. The openings can be arranged next to each other in lateral directions, which run parallel with respect to the display's main plane of extension. This way, each opening leads to a side surface of the substrate. The openings can be narrow in order to form channels. For each back-volume there can be one corresponding vent hole connecting the back-volume to the environment.

An advantage of this construction is that the acoustic resistance of such a vent hole can be arbitrarily increased. The acoustic resistance is large for narrow and long openings. By increasing the acoustic resistance a pressure drop is avoided and the noise level of the apparatus can be reduced.

As an alternative, vent holes can be integrated in each membrane. For example, with respect to the lateral extent of the membrane, the vent hole can be located in the center of the membrane. This means that the vent hole penetrates the membrane. If a gasket and an elastic layer are present, further vent holes are located in the elastic layer above each membrane, wherein the further vent holes penetrate the elastic layer. This way, each back-volume is connected to the environment via the vent hole in the membrane, the front-volume and the further vent hole in the elastic layer. The vent hole can have a small diameter compared with the diameter of the membrane, so that the function and the sensitivity of the membrane is not adversely affected.

Vent holes provide a pressure equalization between the back-volume and the environment. This can be necessary since due to the membrane deflection the change of gas density within the back-volume can affect the system compliance and thus the dynamic characteristics of the membrane. On a timescale, pressure equalization between the back-volume and the environment is slow compared to the signal period of the sound pressure wave.

In an embodiment the optical reading device comprises at least one light source and at least one photodetector. The light source and the photodetector are arranged on a further substrate, wherein the further substrate is attached to the transducer array in the transversal direction under the transducer array.

The further substrate may also comprise a semiconductor material, for example Si. The light source and the photodetector can be integrated on the further substrate. The light source can be, for example, a vertical-cavity surface-emitting laser (VCSEL). However, different light sources, which are able to provide coherent light of an arbitrary wavelength, can be used as well. Additionally, more than one light source can be integrated on the further substrate. The photodetector can be, for example, a photodiode or an array of photodiodes. However, different photodetectors can be used as well. Additionally, more than one photodetector can be integrated on the further substrate.

Further components may also be integrated on the further substrate. By way of example, electrical circuits for triggering and evaluating light signals as well as interferometric equipment like mirrors can also be arranged on the further substrate. As mentioned above, vibrations of the membrane can be detected by use of a laser beam coming from the light source. This is because deflections of the membrane cause changes in the optical path length of the reflected laser beam. Either the phase change of the light can be detected or, when using an interferometer, the intensity change of the light.

The further substrate can be attached to the transducer array by any technique known in the art. For example, bonding techniques can be applied. Alternatively, the further substrate can be attached by an adhesive to the substrate comprising the transducer array. The further substrate is attached to the transducer array in such a way that the displacement of each membrane within the transducer array can be detected separately. An optical path from the light source towards the membranes is given by the respective back-volumes.

By means of the optical reading device the apparatus can be smaller in dimension and thinner in height. This is in contrast to capacitive MEMS microphones, which require a complex supply and sensing scheme due to the reading method for the membrane displacement. As a result, capacitive MEMS microphones require much more space.

In an embodiment each transducer array has a rectangular shape in top-view. The top-view refers to a view on the transducer array from a side facing away from the optical reading device in the transversal direction. In lateral directions the transducer array has a length of at least 1 mm and at most 10 mm.

In a preferred embodiment the transducer arrays have a quadratic shape in top view. In this preferred embodiment each transducer array has a length of at least 1.5 mm and at most 5 mm. In an even more preferred embodiment each transducer array has a quadratic shape in top view with a length of at least 1.7 mm and at most 2.3 mm in each lateral direction.

Due to the small lateral extent of each transducer array they can be installed into systems providing only limited space, such as smartphone displays. However, each transducer array has to provide enough space for a plurality of membranes in order to provide good directionality even at higher frequencies and a good SNR.

In an embodiment each transducer array is spaced from neighboring transducer arrays by at least 1 cm and at most 10 cm in lateral directions.

In a preferred embodiment each transducer array is spaced from neighboring transducer arrays by at least 3 cm and at most 7 cm in lateral directions.

By defining an appropriate spacing between transducer arrays it is possible to arrange more than one transducer array within the display. This way, good directionality even at low frequencies can be obtained. A large spacing between such transducer arrays is beneficial in view of providing a good spatial resolution during sound localization.

In an embodiment each membrane within the transducer array has a round shape in top-view. The round shape has a diameter of at least 0.1 mm and at most 1.5 mm.

Conventional materials like SiN can be used to construct membranes with larger diameters, i.e., diameters of about 1.5 mm. 2D materials can be used to obtain smaller membrane diameters, i.e. diameters of about 0.1 mm. Despite of the small membrane diameter such membranes still achieve acceptable acoustic performance due to the properties of the 2D material such as Young's modulus and density: Membranes comprising a 2D material can have a large deflection even for small diameters. Besides, such membranes can be very thin, since they comprise only few atomic layers. Ideally, the nano-membranes have a thickness of less than 10 nm.

Defining an appropriate diameter for the membranes affects the acoustical performance of each transducer. Additionally, smaller diameters allow more membranes to be arranged in one transducer array as well as larger distances between membranes. Having more membranes leads to a good SNR and directionality at higher frequencies. Larger distances between membranes within the transducer array give good directionality at lower frequencies.

In an embodiment each membrane within the transducer array is spaced to neighboring membranes according to a predetermined pitch. The pitch is defined as the distance between the respective membrane centers, wherein the membrane center refers to its lateral extent. The pitch is at least 0.4 mm and at most 3 mm.

In a preferred embodiment the pitch is at least 0.4 mm and at most 1.7 mm. As mentioned above, smaller pitches allow more membranes to be arranged in one single transducer array, which in turn increases the SNR and enhances the directionality at higher frequencies. A larger pitch between membranes within the transducer array enhances the directionality and spatial resolution at lower frequencies for that single transducer array.

In an embodiment the apparatus comprising the transducer arrays is incorporated in an electronic device. The electronic device can be in particular a smartphone, a smart-speaker, a smart-TV, a smart-TV remote control or any other domestic appliance or any other remote controller, respectively. Since the transducer arrays can be fabricated by a technology for microelectromechanical systems (MEMS) and can have a reduced size the electronic device may have small dimensions.

Furthermore, a method of producing an apparatus for sound detection, sound localization and beam forming is provided. All features disclosed for the apparatus are also disclosed for the method for producing the apparatus and vice-versa.

The method of producing an apparatus for sound detection, sound localization and beam forming comprises providing a display having a main plane of extension. It further comprises providing an optical reading device. A transducer array is produced by providing a substrate and forming a thin-film on a top surface of the substrate. The thin-film can comprise a single material. However, the thin-film can also comprise a stack of different materials, including sacrificial layers or additional reflecting layers, which function as a mirror for the optical reading method. The thin-film can be formed by any technique known in the art. By way of example, the thin-film can be formed by deposition, for example by chemical vapor deposition (CVD) or by plasma enhanced CVD (PECVD). In addition, other processing steps can be included to form the thin-film. For example, the thin-film can also be formed by a thermal processing step, which leads to a solid-state dissolution. By applying a rapid thermal annealing (RTA) step particles can dissolve from one material layer into another, thus forming a new functional layer. Furthermore, the thin-film can be patterned by an etching process.

After forming the thin-film, trenches are formed in the substrate from a rear surface of the substrate towards the thin-film. The trenches can be formed by deep reactive-ion etching (DRIE) or by wet etching or by a combination thereof.

The etching process can be controlled by time or by use of an etch stop layer. In the latter case the etch stop layer has been deposited before forming the thin-film at the main surface of the substrate in places, where the trench shall be formed. The etch stop layer can be removed after forming the opening for example by wet etching.

After forming the trenches in the substrate it can be necessary to remove optional sacrificial layers by an etching process in order to release the actual membranes. A plurality of membranes is formed from respective parts of the thin-film, which are exposed by etching the trenches and optional sacrificial layers. Corresponding integrated back-volumes are formed by the trenches themselves.

After fabricating the transducer array the optical reading device is mounted in a transversal direction under the transducer array, thereby forming a microphone stack. The transversal direction extends perpendicular to the main plane of extension of the display. Mounting can be performed for example by bonding techniques or by means of an adhesive. In particular wafer level bonding, such as anodic bonding or oxide-oxide bonding or hybrid bonding can be performed. The mounting of the optical reading device takes place in such a way that the back-volumes provide optical paths for light coming from a light source on the optical reading device towards the membranes. Therefore, the optical reading device has to be aligned to the transducer array.

In a next step an elastic connector is formed around the microphone stack, the elastic connector surrounding the microphone stack in lateral directions that extend parallel to the main plane of extension of the display. Forming the elastic connector can be done, for example, by molding.

The microphone stack with the elastic connector is mounted into the display. This means that the respective microphone stack is inserted into a gap within the display. In lateral directions the display surrounds the microphone stack at a distance, wherein the elastic connector mechanically connects the display to the microphone stack.

Well-known MEMS processes can be used to fabricate the transducer arrays. Such fabrication is very cost-effective. Furthermore, also the optical reading device can be fabricated by a semiconductor process. Due to the small size of each transducer array with integrated back-volumes and due to the stacked arrangement with the optical reading device it is possible to place such microphone stacks within displays of electronic devices, where only little space is available.

In an embodiment of the method producing the microphone stack the method further comprises providing an elastic layer. Also, a gasket with a plurality of through-holes penetrating the gasket is provided. If silicon is used as material for the gasket, conventional processes like DRIE can be applied for forming the through-holes. The gasket is mounted in the transversal direction under the elastic layer, for example by means of an adhesive. Furthermore, the transducer array with the attached optical reading device is mounted in the transversal direction under the gasket with the elastic layer. This means that the gasket is arranged between the elastic layer and the transducer array. The membranes of the transducer array are aligned with the through-holes of the gasket. Mounting can be done by means of an adhesive. In case that the gasket comprises Si or glass bonding processes, in particular wafer level bonding, such as anodic bonding or oxide-oxide bonding or hybrid bonding can be performed, too.

By providing an elastic layer and a gasket above the transducer array the sensitive membranes of the transducer array are protected against environmental impacts and external forces like touching. This is because the membranes are located within the apparatus and spaced from the display by the gasket. However, due to the flexibility of the elastic layer sound pressure waves can be forwarded to the membranes of the transducer array.

In another embodiment of the method the thin-film comprises a 2D material layer. The membranes of the transducer array are formed from respective portions of the 2D material layer. In this embodiment the 2D material layer is the topmost layer of the microphone stack. Thus, there is no need for the elastic layer or the gasket.

By using 2D materials for the membrane and due to the 2D material properties such as Young's modulus, density etc., smaller membrane diameters can be achieved. Membranes comprising 2D materials are more resistant to environmental impacts, so they can be exposed directly to the environment.

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1A:
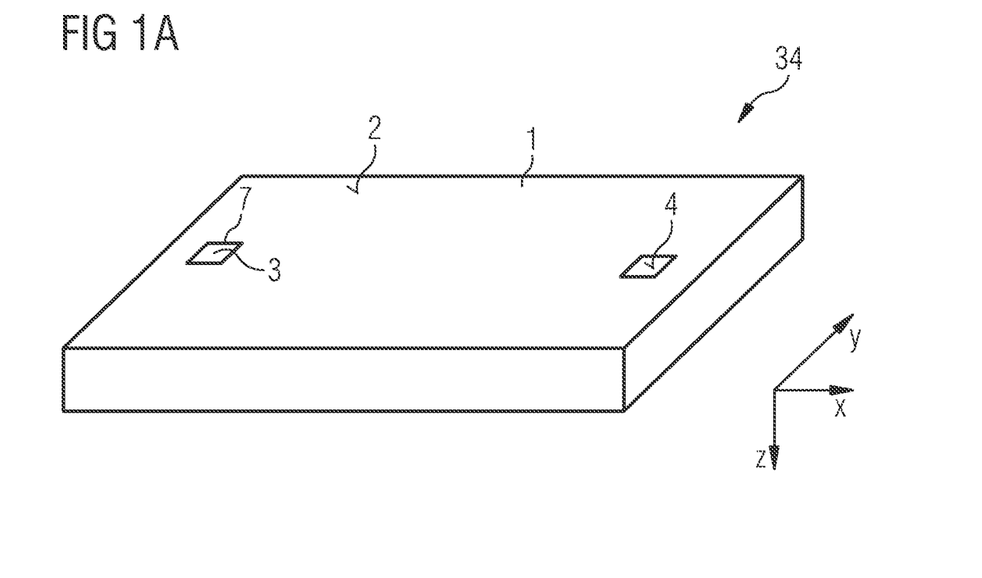
FIGS. 1a and 1b show a schematic of an embodiment of an apparatus comprising a display with two integrated microphone stacks.

In FIG. 1a a perspective schematic of an apparatus 34 comprising a display 1 is shown. The display 1 can be comprised by any electronic device 20, for example by a smartphone etc. The display 1 has a main plane of extension, which runs parallel to lateral directions x, y. Besides, the display 1 extends also in a transversal direction z, which is perpendicular to the main plane of extension of the display. The display has a top surface 2.

FIG. 1a also shows two microphone stacks 3 mounted in the display 1. The display 1 surrounds each microphone stack 3 in lateral directions x, y. Between the display 1 and each microphone stack 3 a gap is present. The microphone stacks 3 have a further top surface 4. In the transversal direction z the further top surface 4 of each microphone stack 3 and the top surface 2 of the display 1 have the same level, so that they form a common surface. However, it is also possible that there is an offset between the top surface 2 of the display 1 and the further top surface 4 of the microphone stacks 2 in the transversal direction z. Furthermore, in the transversal direction z the microphone stack 3 comprises at least one transducer array 5 with a plurality of membranes 14 and corresponding back-volumes 17 (not shown) and one optical reading device 6 (not shown). The transducer array 5 as well as the optical reading device 6 are not shown in FIG. 1a.

The gap between the display 1 and the microphone stacks 3 is filled by a respective elastic connector 7. Each elastic connector 7 surrounds one corresponding microphone stack 3 in lateral directions x, y. Moreover, each elastic connector 7 mechanically connects the display 1 to the microphone stacks 3. The elastic connector 7 can comprise PDMS, by way of example.

Figure 1B:
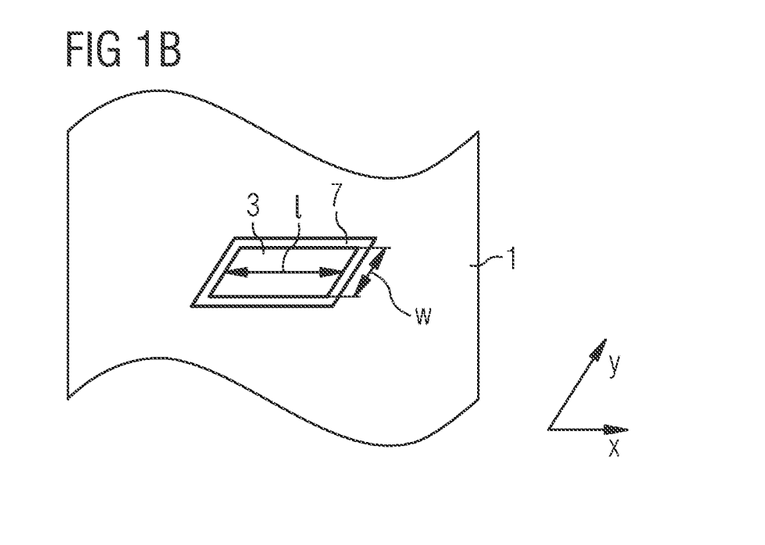

FIG. 1b shows a detail of a microphone stack 3 within a part of the display 1. In a top-view, which refers to a view on the top surface 2 of the display 1 in the transversal direction z, the microphone stack 3 has a rectangular shape. However, in other embodiments different shapes are also possible. The extent of the microphone stack 3 in the lateral direction x is denoted by a length 1. The extent of the microphone stack 3 in the further lateral direction y is denoted by a width w.

Figure 2:
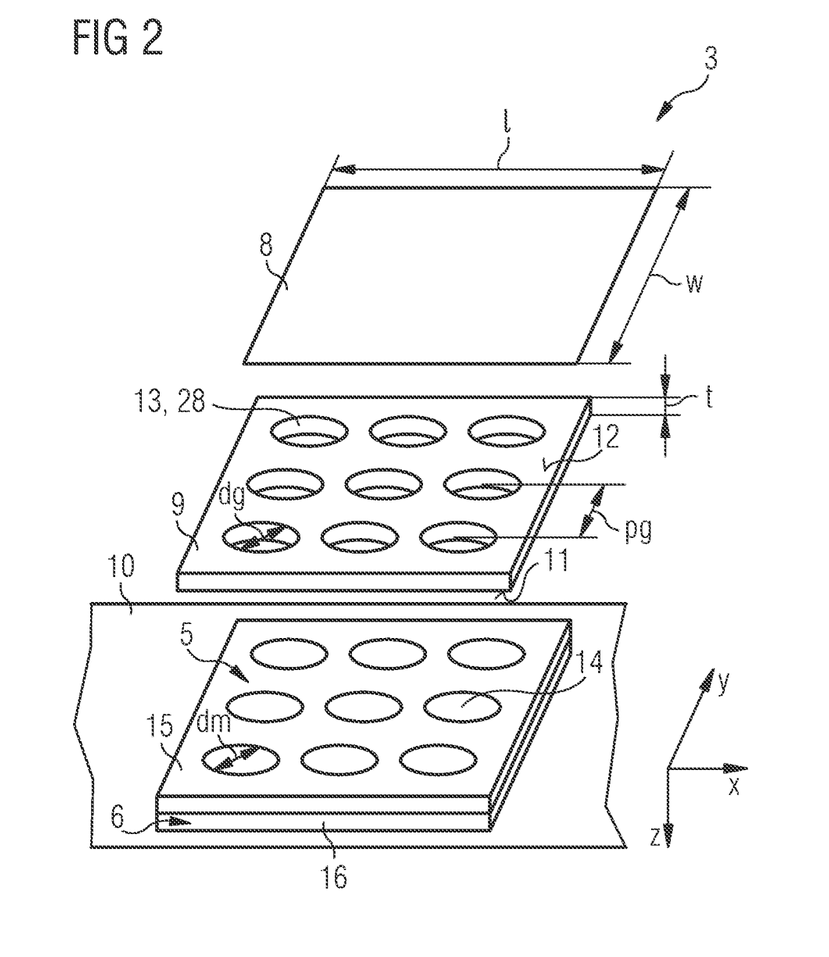
FIG. 2 shows an exploded assembly drawing of an embodiment of a microphone stack.

In FIG. 2 an exploded view drawing of an embodiment of a microphone stack 3 is shown. Different components of the microphone stack 3, which are arranged to each other in the transversal direction z, are shown. In the embodiment shown in FIG. 2 the microphone stack 3 comprises, from top to bottom, an elastic layer 8, a gasket 9, a transducer array 5 and an optical reading device 6. Moreover, the microphone stack 3 can be arranged on a printed circuit board (PCB) 10 or a flexible PCB 10. All components of the microphone stack 3 can have the same measures in top view. This means that they all extend in the lateral directions x, y according to the width w and the length 1.

The elastic layer 8 is the topmost layer of the microphone stack 3. The elastic layer 8 can comprise a nano-material, for example carbon. This way, the elastic layer can form a carbon nano-membrane. On the one hand, the elastic layer 8 is flexible in terms of its Young's modulus. On the other hand, the elastic layer 8 can withstand environmental impacts. So it protects the sensitive membranes 14 of the transducer array 5 underneath.

The gasket 9 is arranged in the transversal direction z under the elastic layer 8. The gasket has a first surface 11 and a second surface 12 opposite to the first surface 11. The gasket 9 is in mechanical contact with the transducer array 5 via the first surface 11 as well as with the elastic layer 8 via the second surface 12. In the transversal direction z the gasket 9 extends according to a thickness t. A plurality of through-holes 13 penetrate the gasket 9. In this example, the gasket 9 comprises nine through-holes 13 arranged in a regular 3×3 grid. The through-holes 13 penetrate the gasket 9 from its first surface 11 towards its second surface 12. Each through-hole has a diameter dg. The pitch of through-holes 13, i.e. the distance between centers of neighboring through-holes 13, is denoted by pg.

In the embodiment of FIG. 2 the transducer array 5 comprises nine membranes 14. In general, the number of membranes 14 matches the number of through-holes 13 in the gasket 9. Each membrane 14 has a circular shape in top-view. The diameter of each membrane 14 is denoted by dm. FIG. 2 shows an embodiment, in which the transducer array 5 can be fabricated by conventional MEMS materials with conventional MEMS fabrication techniques. This means that the transducer array 5 can comprise, for example, a semiconductor substrate 15 comprising Si. The membranes can comprise SiN, for example. Under each membrane 14 there is a corresponding back-volume 17, which is formed by a cavity in the substrate 15. However, such cavity is not shown in FIG. 2. The plurality of membranes 14 are aligned with the plurality of through-holes 13 of the gasket 9. This means that in the transversal direction z above each membrane 14 a front-volume 28 is formed by the respective through-hole 13. The diameter dm of each membrane 14 can be equal to or less than the diameter dg of the through-hole 13.

The optical reading device 6 is arranged in the transversal direction z under the transducer array 5. The optical reading device 6 is attached to the transducer array 5 in such a way, that the displacement of each membrane 14 can be detected separately. The optical reading device 6 can comprise a further substrate 16, one or more light sources 25 (not shown) and one or more photodetectors 26 (not shown). Besides, the optical reading device 6 can also be fabricated by semiconductor techniques.

Figure 3A:
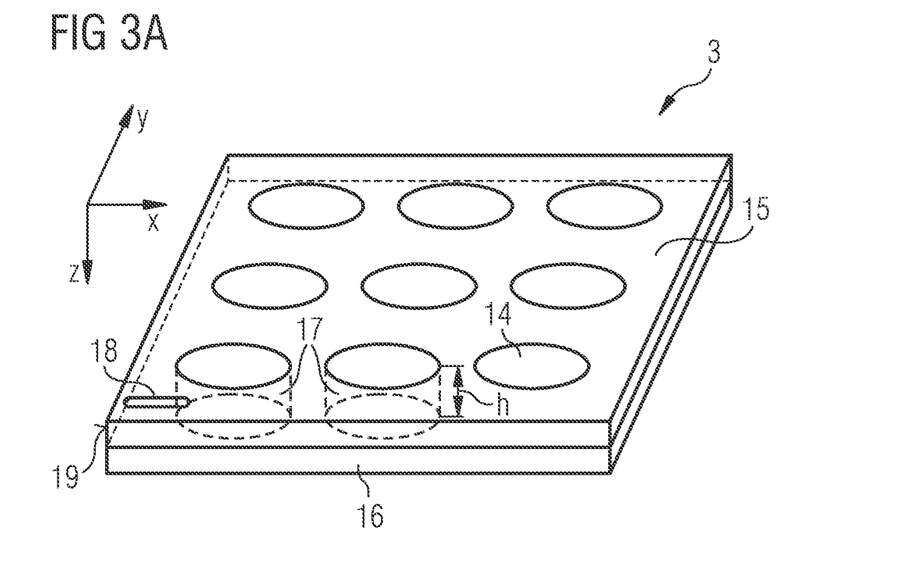
FIGS. 3a and 3b show details of an embodiment of a microphone stack comprising vent holes.

FIG. 3a shows an embodiment of a microphone stack 3 according to FIG. 2 without the gasket 9 and the elastic layer 8. In this drawing back-volumes 17 formed by cavities in the substrate 15 are indicated by dashed lines for two of the nine membranes 14. The back-volumes 17 are arranged in the transversal direction z under each membrane 14. The height h of the back-volume 17, which corresponds to the extent of the back-volume 17 in the transversal direction z, depends on the height of the substrate 15.

Additionally, FIG. 3a shows an exemplary vent hole 18 for one of the back-volumes 17. The vent hole 18 connects the corresponding back-volume 17 with the environment. In this example, the vent hole 18 is formed by an opening in the substrate 15. The vent hole 18 forms a channel extending in a lateral direction x from the back-volume 17 towards a side surface 19 of the substrate 15. Further vent holes 18 for other back-volumes 17 can extend in different lateral directions x, y in order to reach a respective side surface 19 of the substrate 15.

Figure 3B:
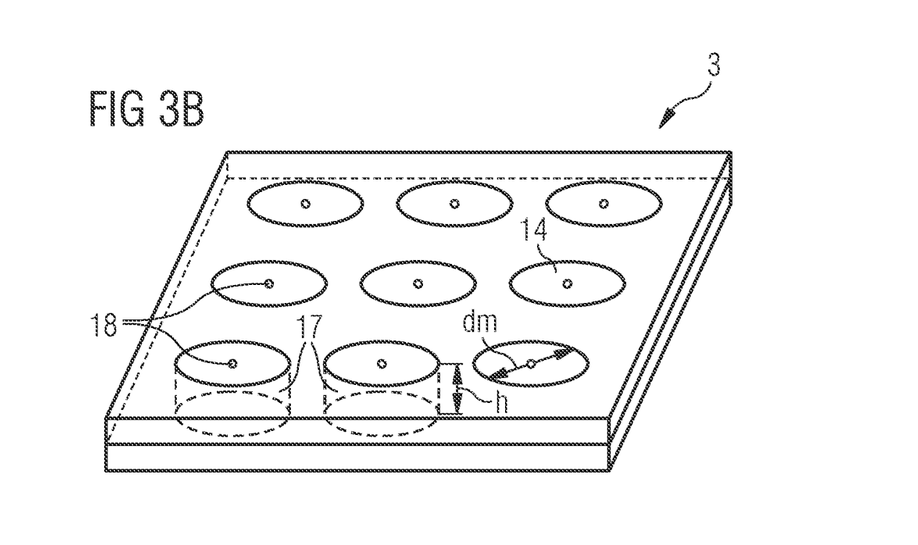

FIG. 3b shows another embodiment of a microphone stack 3 comprising different vent holes 18. In this embodiment each membrane 14 is penetrated by a vent hole 18 in its center, which connects the back-volume 17 to the environment above each membrane 14. It should be noted that, if a gasket 9 and an elastic layer 8 are present (not shown), the elastic layer 8 has to comprise vent holes 18 as well. In this case the back-volume 17 is connected via the front-volume 28 (not shown) formed by the gasket 9 to the environment above the elastic layer 8.

In either case the vent holes 18 have a small diameter compared with the diameter dm of the membrane 14. This ensures a large acoustic resistance of the vent holes 18. The acoustic resistance of the vent holes 18 forms, together with the acoustic compliance of the back-volume 17, an acoustical high pass filter. In order to have a low high pass cut-off frequency the acoustic resistance of the vent holes 18 has to be large. The vent holes 18 provide a pressure equalization between the back-volumes 17 and the environment.

Figure 4A:
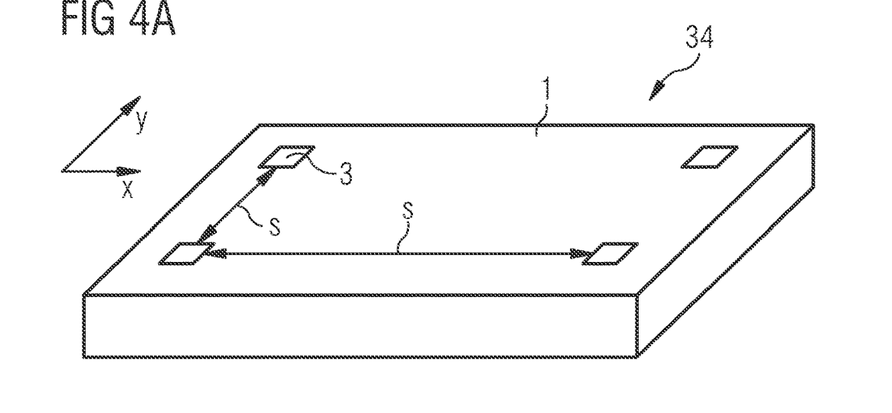
FIGS. 4a to 4c show schematics of two embodiments of an apparatus comprising a display with four integrated microphone stacks.

In FIG. 4a another embodiment of an apparatus 34 for sound detection, sound localization and beam forming is shown. FIG. 4a differs from FIG. 1a in that is shows four microphone stacks 3 within the display 1. The microphone stacks 3 are spaced to each other by a spacing s. Each microphone stack 3 is spaced to neighboring microphone stacks 3 by at least 1 cm and at most 10 cm in lateral directions x, y. However, in the particular embodiment shown in FIG. 4a the spacing s can be about 7 cm.

Figure 4B:
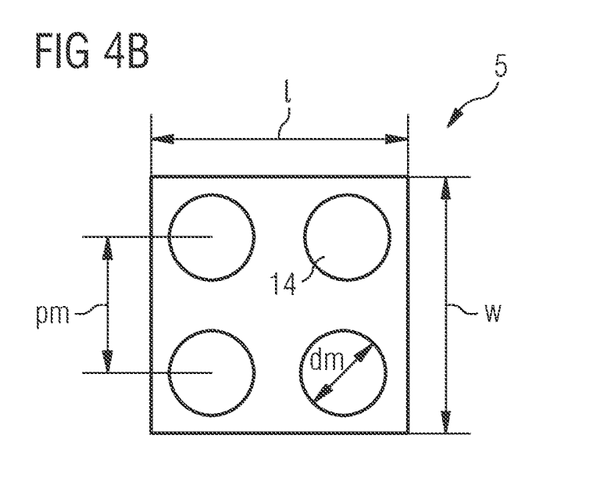

FIG. 4b shows an embodiment of a transducer array 5, which can be used in the exemplary embodiment of the apparatus 34 according to FIG. 4a. In this example, the transducer array 5 has a quadratic shape in top-view. The length 1 and the width w of the transducer array 5 are at least 1 mm and at most 10 mm. However, in this particular embodiment the length 1 and the width w of the transducer array 5 can be about 2 mm. The transducer array 5 comprises four membranes 14. The diameter dm of the membranes 14, which have a circular shape in top-view, is at least 0.1 mm and at most 1.5 mm. In this particular embodiment the diameter dm can be about 0.5 mm. The pitch pm of the membranes 14, i.e. the distance between their centers, is at least 0.4 mm and at most 3 mm. In this particular embodiment the pitch pm can be about 1.5 mm. The membranes 14 can comprise silicon nitride (SiN) and can have a thickness, which is suitable for the desired application. For example, the thickness can be at least 100 nm and at most 500 nm.

With the arrangements according to FIGS. 4a and 4b an apparatus 34 for sound detection, sound localization and beam forming can be realized, which has a suitable acoustic performance. Although one single transducer array 5 is not covering the full audio frequency range for directionality and spatial resolution, combining four of them can already have good directionality even at low frequencies. With some algorithm for sound localization and beam forming, one single transducer array 5 can cover the higher frequency range, while the combination of four transducer arrays can cover the lower frequency range for good directionality. The time delay and the spatial resolution of such apparatus 34 can be determined by evaluation of the auto-correlation function directly or by evaluation of the Hilbert transformation of the auto-correlation function. It can be shown that such apparatus 34 exhibits a time delay of a few microseconds and can resolve sound directions down to approximately 2°.

Figure 4C:
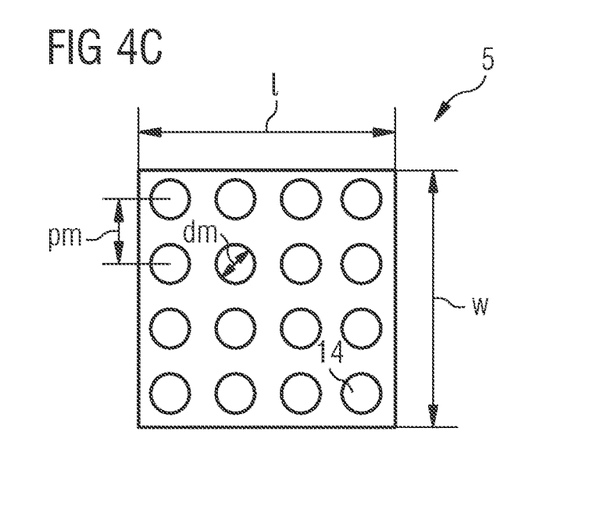

Another embodiment of a transducer array 5, which can be used for an apparatus 34 according to FIG. 4a, is shown in FIG. 4c. In this particular embodiment the transducer array 5 also has a quadratic shape in top-view, whereas the length l and the width w can have the same dimensions as in FIG. 4b, i.e. about 2 mm. However, in this case the transducer array 5 comprises sixteen membranes 14 arranged on a regular 4×4 grid. Thus, the diameter dm of each membrane 14 has to be smaller, i.e. can be about 0.1 mm. The pitch pm is about 0.4 mm.

Such small membrane diameters dm can be realized by 2D materials. This is because membranes 14 comprising a 2D material layer still achieve an acceptable acoustic performance even if they exhibit a small diameter dm. The acoustic performance of a transducer array 5 according to FIG. 4c is similar to one according to FIG. 4b. However, due to the increased number of membranes 14, each single transducer array 5 can have an increased SNR.

Figure 5A:
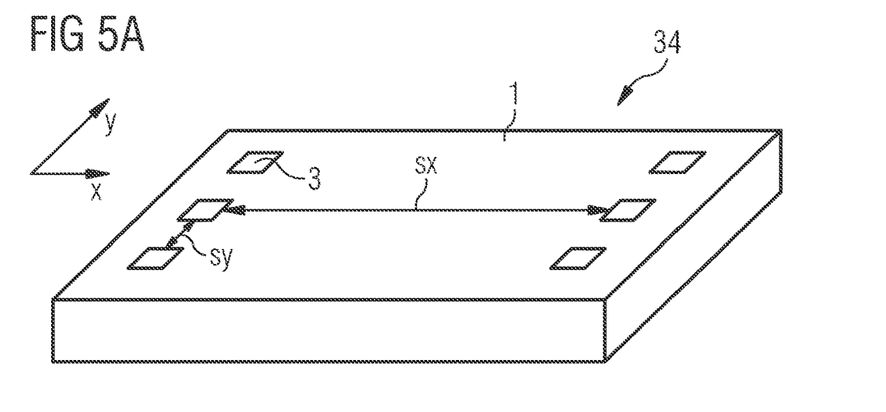
FIGS. 5a to 5b show schematics of an embodiment of an apparatus comprising a display with six integrated microphone stacks.

In FIG. 5a another embodiment of an apparatus 34 for sound detection, sound localization and beam forming is shown. FIG. 5a differs from FIG. 1a in that is shows six microphone stacks 3 within the display 1. In the lateral direction y, the microphone stacks 3 are spaced from each other by a spacing sy. In the particular embodiment shown in FIG. 5a the spacing sy can be about 3 cm. As in FIG. 4a the spacing sx in the lateral direction x can be about 7 cm.

Figure 5B:
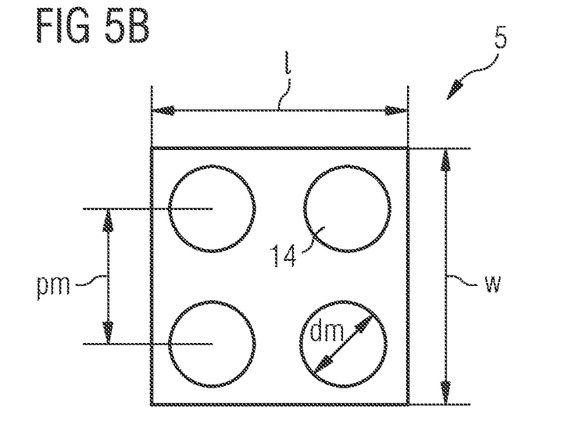

FIG. 5b shows an exemplary embodiment of a transducer array 5, which can be used for the embodiment of the apparatus 34 according to FIG. 5a. Also in this example, the transducer array 5 has a quadratic shape in top-view with length l and width w of about 2 mm. The diameter dm of the membranes 14, which have a circular shape in top-view, can be about 0.1 mm. The pitch pm of the membranes 14, i.e. the distance between their centers, can be about 1.7 mm. As in the embodiment according to FIG. 4c the membranes 14 can comprise a 2D material layer of a suitable thickness, for example only a few nanometers.

Due to the small diameter dm the membranes 14 can be put further apart even within a transducer array 5 with a small aperture (length l×width w). A large distance between membranes 14 within one single transducer array 5 gives an acceptable directionality even at relatively low frequencies, for example down to 10 kHz. It can be shown that an apparatus 34 realized as in FIGS. 5a and 5b exhibits a spatial resolution of about 5°.

It should be noted again that membranes 14 comprising a 2D material layer can be used without a gasket 9 and additional elastic layer 8 in contrast to the case when standard MEMS materials are used. Membranes 14 comprising 2D material layers can be directly installed into the display 1.

Figure 6:
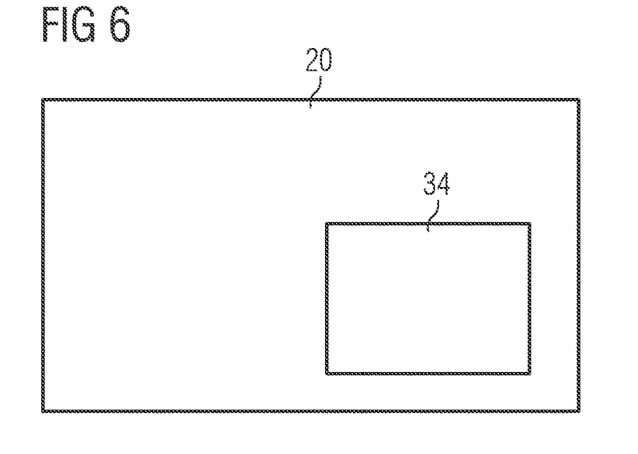
FIG. 6 shows a schematic diagram of an exemplary embodiment of an electronic device comprising an apparatus for sound detection, sound localization and beam forming.

In FIG. 6 a schematic diagram of an exemplary embodiment of an electronic device 20 comprising an apparatus 34 for sound detection, sound localization and beam forming is shown. The electronic device 20 can be, for example, a smartphone, a smart-speaker, a smart-TV, a smart-TV remote control or any other domestic appliance or any other remote controller, respectively.

With FIGS. 7a to 7f an exemplary embodiment of a method of producing a microphone stack 3 is shown. The microphone stack 3 comprises a transducer device, which comprises conventional MEMS materials, so that the membranes 14 have to be protected by an additional gasket 9 and an elastic layer 8. Besides, the fabrication is shown exemplarily for only one membrane 14. However, in general several membranes are arranged within the transducer array 5. The shown fabrication process has to be understood just as an example, since different fabrication processes can also be applied.

Figure 7A:
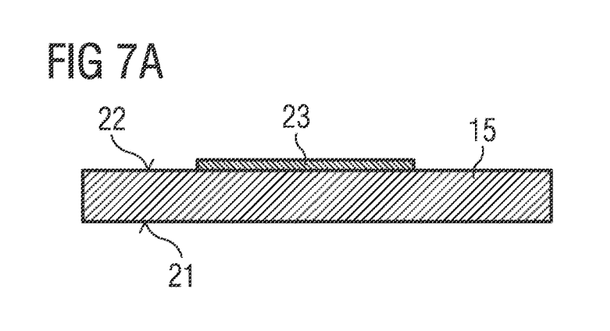
FIGS. 7a to 7f show an embodiment of a method of producing an apparatus for sound detection, sound localization and beam forming.

The method comprises providing a substrate 15, as shown in FIG. 7a. The substrate has a rear surface 21 and a main surface 22. The substrate 15 can comprise Si. On the main surface 22 of the substrate 15 a thin-film 23 is formed. For example, the thin-film 23 can be formed by deposition and subsequent etching in order to structure the thin-film 23. The thin-film 23 may comprise SiN.

Figure 7B:
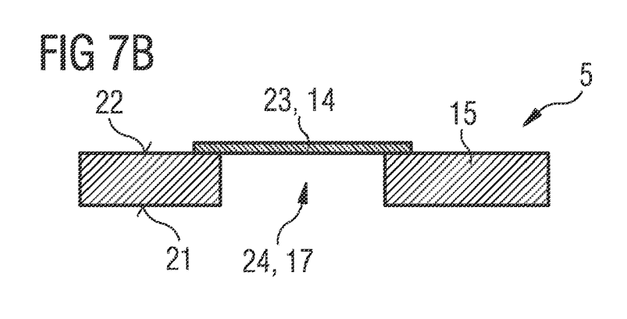

In a next step according to FIG. 7b trenches 24 are formed in the substrate 15 from the rear surface 21 towards corresponding portions of the thin-film 23. This means that the trench 24 penetrates the substrate 15 in regions where a thin-film 23 is present at the main surface 22 of the substrate 15. The trenches 24 may have a smaller lateral extent than the thin-film 23, so that a portion of the thin-film 23 is still supported by the substrate 15. The exposed portions of thin-film 23 form membranes 14 capable to become deflected. The trenches 24 form back-volumes 17 under each membrane 14. The whole structure forms the transducer array 5.

Figure 7C:
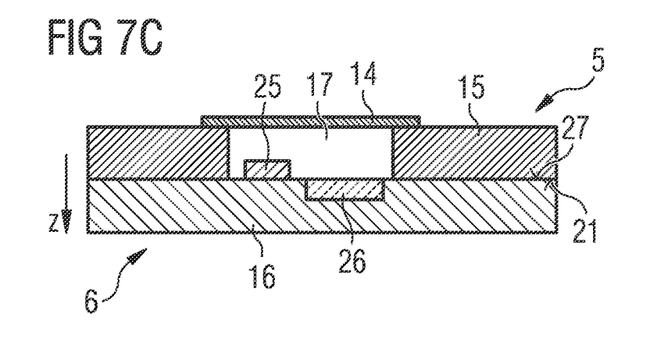

An optical reading device 6 is provided (FIG. 7c). It may comprise a further substrate 16, for example a semiconductor substrate comprising Si. On the further substrate 16 at least one light source 25 and at least one photodetector 26 are arranged at a top surface 27 or within the further substrate 16. For example, the photodetector 26 can be a photodiode or an array of photodiodes made with conventional complementary metal-oxide-semiconductor (CMOS) processes. FIG. 7c shows a one-to-one relationship between membranes 14 and light sources 25. However, it is also possible that for a complete microphone stack 3 only one light source 25, for instance a VCSEL, is used. In this case, light waveguides can be used to provide light to each membrane 14. The optical reading device 6 is mounted in a transversal direction z under the transducer array 5. This means that the rear surface 21 of the substrate 15 is attached to the top surface 27 of the further substrate 16. The attachment can be realized by means of a bond or an adhesive. The substrate 15 and the further substrate 16 are aligned in such a way that the optical reading device 6 can detect displacements of each membrane 14 by means of the light source 25 and the photodetector 26 through the back-volume 17.

Figure 7D:
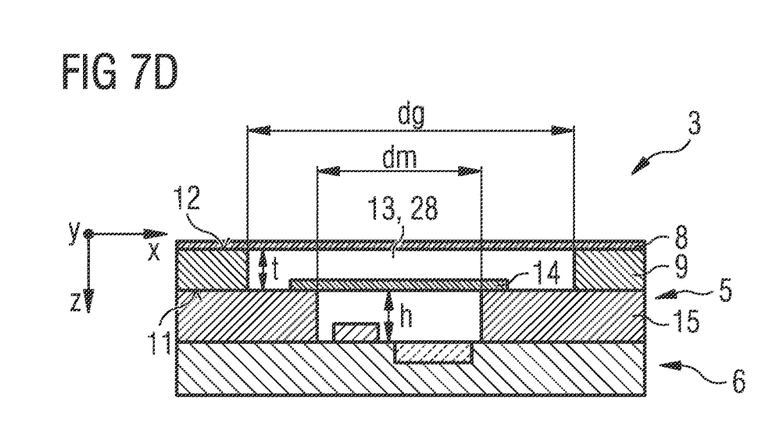

As shown in FIG. 7*d* a gasket 9 and an elastic layer 8 are provided. The gasket 9 exhibits a plurality of through-holes 13 penetrating the gasket 9. This means that the through-holes 13 connect the first surface 11 with the second surface 12 of the gasket 9. The through-holes 13 may have a diameter dg, which is larger than the diameter dm of the membranes 14. The gasket 9 is mounted in the transversal direction z under the elastic layer 8, so that the second surface 12 of the gasket 9 is attached to the elastic layer 8.

The transducer array 5 with the optical reading device 6 is mounted in the transversal direction z under the gasket 9 with the elastic layer 8 in such a way that the first surface 11 of the gasket 9 is attached to the main surface 22 of the substrate 15. Hereby, a front-volume 28 above the membrane 14 and under the elastic layer 8 is formed. The gasket 9 seals the front-volume 28. The membranes 14 are aligned with the through-holes 13 of the gasket 9. This means that in lateral directions x, y the membranes 14 are arranged within the through-holes 13. The thickness t of the gasket 9 may be smaller than the height h of the back-volume 17. The thickness t of the gasket 9 affects the size of the front-volume 28 and thus its resonant frequency. In order to obtain a resonant frequency as high as possible the gasket 9 should be thin. The resulting structure of FIG. 7*d* forms the microphone stack 3.

Figures 7E, 7F:
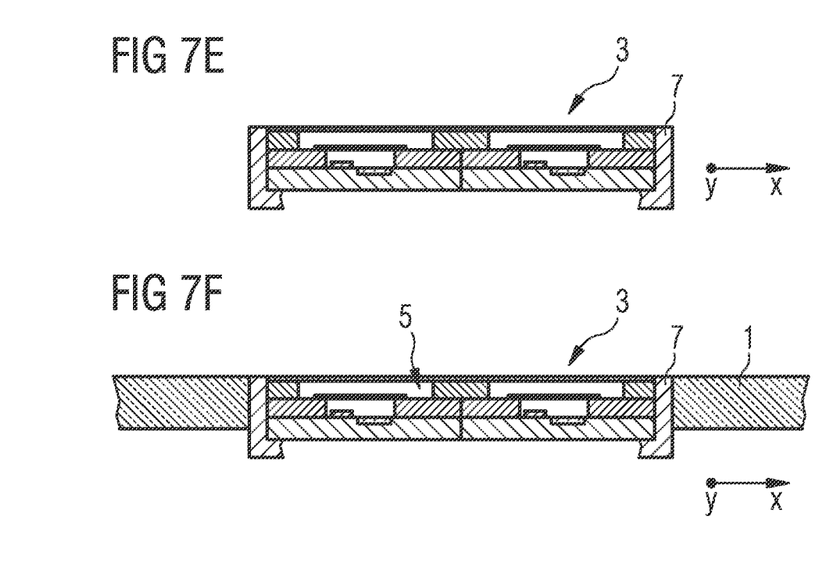

In FIG. 7*e* a cross-section of two neighboring membrane structures of one microphone stack 3, is shown. Additionally, FIG. 7*e* shows an elastic connector 7, which is formed in lateral directions x, y around the microphone stack 3. Forming a surrounding elastic connector 7 can be achieved by means of molding. The elastic connector 7 may comprise, for example, PDMS.

In the next step (FIG. 7*f*) the microphone stack 3 with the elastic connector 7 is mounted into the display 1, wherein the display 1 surrounds the microphone stack 3 in lateral directions x, y at a distance and wherein the elastic connector 7 mechanically connects the display 1 to the microphone stack 3. The elastic connector 7 reduces structure borne sound transmission from the display 1 to the transducer array 5. In FIG. 7*f* no vent holes 18 are shown. However, it should be noted that vent holes 18 may also be present as according to FIG. 3*a* or FIG. 3*b*.

Figure 8A:
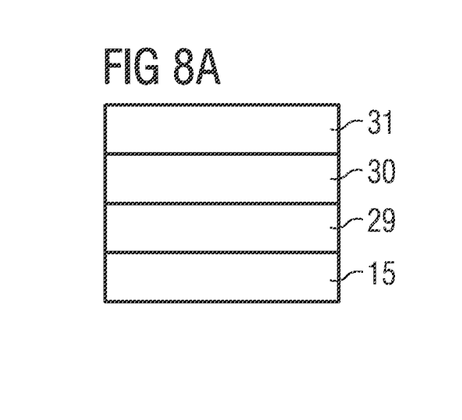
FIGS. 8a to 8f show an embodiment of a method of producing a transducer array comprising a two-dimensional (2D) material layer.
Figure 8B:
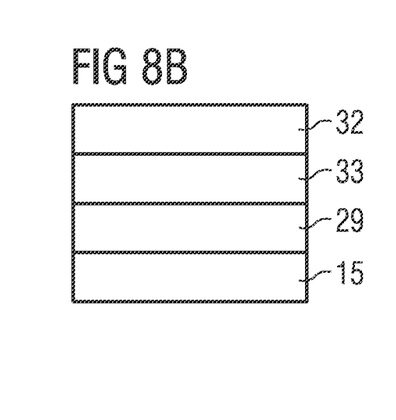
Figure 8C:
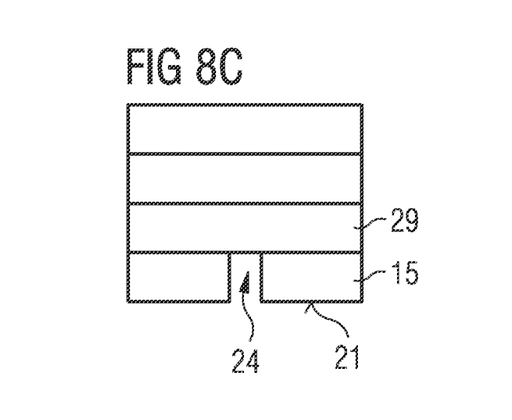
Figure 8D:
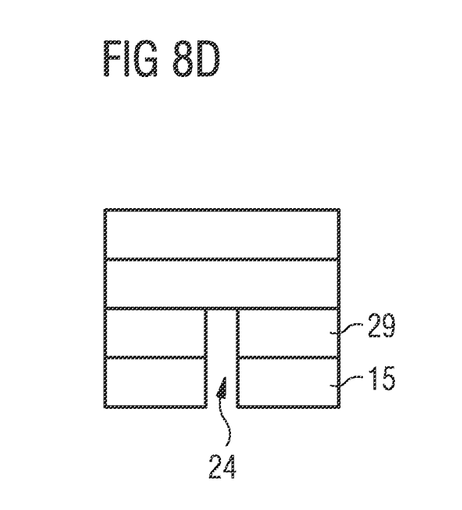
Figure 8E:
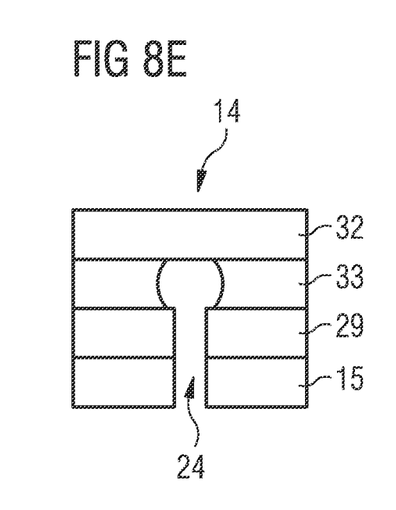
Figure 8F:
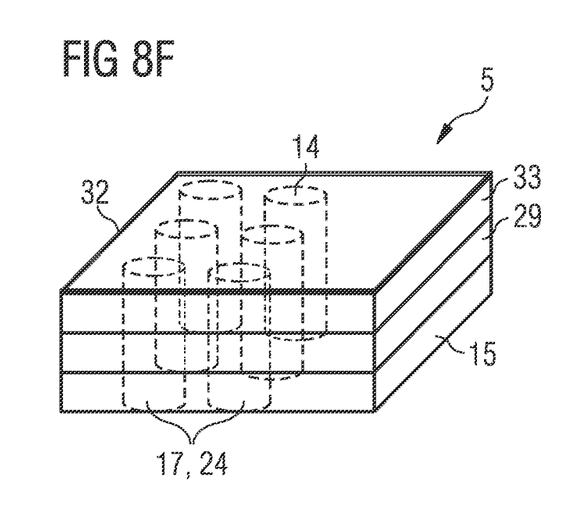

With FIGS. 8*a* to 8*f* an exemplary embodiment of another method of producing a transducer array 5 is shown. The transducer array 5 comprises 2D materials, so there is no need to protect the membranes 14 by an additional gasket 9 and an elastic layer 8. Besides, in FIGS. 8*a* to 8*e* the fabrication is shown exemplarily for only one membrane. However, in general several membranes 14 are arranged within the transducer array 5 as shown in FIG. 8*f*. The method should be seen as an example for fabricating a membrane 14 comprising a 2D material layer, in this case graphene. However, different 2D materials, for example molybdenum disulphide (MoS2) etc. can be used as well, for which the fabrication process could by slightly different.

In FIG. 8*a* a substrate 15 with a film stack on top of it is shown. In this case, the substrate 15 comprises silicon. The film stack may be deposited on the substrate 15. The first layer of the film stack, which is in mechanical contact with the main surface of the substrate, may comprise silicon-oxide ($SiO_2$), thus forming a silicon-oxide layer 29. However, also a layer comprising SiN is possible for the first layer of the film stack. The first layer may be obtained through oxidation of the substrate (either wet or dry oxidation), deposited through PVD (sputtering or evaporation) or CVD (LPCDVD, TEOS, Plasma or thermal CVS) or by spin-coating and baking (spin-on glass). The second layer on top of the first layer may comprise silicon-carbide (SiC), thus forming a silicon-carbide layer 30. The second layer may be deposited by PVD (sputtering or evaporation) or by CVD (Plasma or thermal CVD or LPCVD). The first layer is arranged between the substrate 15 and the second layer and functions as a diffusion barrier in order to prevent particles to diffuse from the second layer into the substrate 15. The third layer of the film stack is arranged on top of the second layer, so that the second layer lies between the first layer and the third layer. The third layer may comprise nickel (Ni), thus forming a nickel layer 31. The third layer may be deposited by PVD (sputtering or evaporation).

FIG. 8*b* shows the substrate 15 and the film stack after thermal processing. The thermal processing may comprise a rapid thermal annealing (RTA) step of about 1000° C. At this temperature, solid-state diffusion can take place leading to a transformation of the silicon-carbide layer 30 and the nickel layer 31. Carbon dissolves in the nickel by RTA. Upon cooling, the carbon segregates to the nickel surface thus forming a graphene layer 32 as a thin-film on the nickel-silicide layer 33.

In the next step (FIG. 8*c*) a trench 24 is formed in the substrate from the rear surface 21 towards the silicon-oxide layer 29 exposing the silicon-oxide layer 29. The trench 24 can be formed by etching. In case of a silicon substrate 15 the etching can be, for example, deep reactive ion etching (DRIE), xenon difluoride etching (XeF2) cryogenic silicon etching or dry etching with sulfur hexafluoride (SF6) and octafluorocyclobutane (C4F8). However, the etching may also be executed wet-chemically using KOH or TMAH for instance.

FIG. 8*d* shows extending the trench 24 into the silicon-oxide layer 29. This means that the silicon-oxide layer 29 is removed in regions, where the trench 24 in the substrate 15 is formed. Removing the silicon-oxide layer 29 can be achieved by dry oxide etching with fluoroform (CHF3) and oxygen (O2), with tetrafluoromethane (CF4) and argon (Ar) or by wet etching with acid-based agents (buffered HF (BHF) or pure aqueous HF).

In the next step according to FIG. 8*e* the trench 24 is further extended by removing the nickel-silicide layer 33 in places. This means that the nickel-silicide layer 33 is removed in regions where the trench 24 in the substrate 15 and the silicon-oxide layer 29 are formed. Removing the nickel-silicide layer 33 can be achieved by nitric acid based solution or by HF. The etching can be isotropic and releases the graphene layer 32, which forms a membrane 14 in places, where the trench 24 is formed beneath. After etching a drying step can be necessary. Nitrogen drying, compressed air drying or critical point drying can be employed.

FIG. 8*f* shows a perspective view on the final structure of the transducer array 5. In this embodiment, the transducer array 5 comprises 2×3=six membranes 14. But also other geometries, such as an array comprising 2×2=four or 3×3=nine membranes can be envisioned. The membranes 14 are formed by respective portions of the graphene layer 32. Corresponding back-volumes 17 are formed by trenches 24 in the substrate 15, the silicon-oxide layer 29 and the nickel-silicide layer 33 under each membrane 14. In a subsequent processing step and according to FIG. 7*c* an optical reading device 6 has to be mounted under the transducer array 5 to complete the microphone stack 3. Then, the microphone stack 3 is inserted into a display 1 by use of an elastic connector 7, as shown in FIGS. 7*e* and 7*f*.

The invention claimed is:

1. An apparatus for sound detection, sound localization and beam forming, the apparatus comprising:
a display having a main plane of extension,
a plurality of microphone stacks, wherein the display surrounds each microphone stack in lateral directions, that extend parallel to the main plane of extension of the display, and
a plurality of elastic connectors, wherein each elastic connector surrounds one respective microphone stack in lateral directions and mechanically connects the respective microphone stack with the display,
wherein each microphone stack comprises
a microelectromechanical transducer array, the transducer array comprising a plurality of membranes and corresponding integrated back-volumes, the back-volumes being arranged under the membranes in a transversal direction, that extends perpendicular to the main plane of extension of the display, wherein the transducer array further comprises a substrate, a thin-film on a main surface of the substrate, and trenches formed from a rear surface of the substrate towards the thin-film, wherein the membranes are formed by respective parts of the exposed thin-film and the back-volumes are formed by the trenches, and
an optical reading device configured to separately detect the displacement of each membrane.

2. The apparatus according to claim 1, wherein each microphone stack further comprises
an elastic layer, and
a gasket comprising a plurality of through-holes penetrating the gasket, wherein in the transversal direction the gasket is arranged between the elastic layer and the transducer array and the membranes of the transducer array are aligned with the through-holes of the gasket.

3. The apparatus according to claim 1, wherein each microphone stack further comprises a 2D material layer as topmost layer, wherein the membranes of the transducer array being formed from respective portions of the 2D material layer.

4. The apparatus according to claim 1, wherein each transducer array further comprises a substrate arranged in the transversal direction under the plurality of membranes and wherein each back-volume is formed by a cavity in the substrate under the respective membrane.

5. The apparatus according to claim 4, wherein the transducer array further comprises vent holes connecting each back-volume with the environment, the vent holes being formed by openings in the substrate.

6. The apparatus according to claim 1, wherein the optical reading device comprises at least one light source and at least one photodetector, wherein the light source and the photodetector are arranged on a further substrate, the further substrate being attached to the transducer array in the transversal direction under the transducer array.

7. The apparatus according to claim 1, wherein each transducer array has a rectangular shape in top-view, where in each lateral direction the transducer array has a length and a width of at least 1 mm and at most 10 mm.

8. The apparatus according to claim 1, wherein in lateral directions each transducer array is spaced from neighboring transducer arrays by at least 1 cm and at most 10 cm.

9. The apparatus according to claim 1, wherein each membrane within the transducer array has a round shape in top-view, where the round shape has a diameter of at least 0.1 mm and at most 1.5 mm.

10. The apparatus according to claim 1, wherein each membrane within the transducer array is spaced to neighboring membranes according to a predetermined pitch, the pitch being defined as distance between the respective membrane centers, where the pitch is at least 0.4 mm and at most 3 mm.

11. An electronic device comprising an apparatus according to claim 1, wherein in particular the electronic device is a smartphone, a smart-speaker, a smart-TV, a smart-TV remote control or any other domestic appliance or any other remote controller, respectively.

12. A method of producing an apparatus for sound detection, sound localization and beam forming, the method comprising:
providing a display having a main plane of extension,
providing an optical reading device,
producing a transducer array by providing a substrate,
forming a thin-film on a main surface of the substrate,
forming trenches in the substrate from a rear surface of the substrate towards the thin-film, wherein a plurality of membranes is formed from respective parts of the exposed thin-film and corresponding integrated back-volumes are formed by the trenches,
mounting the optical reading device in a transversal direction under the transducer array, thereby forming a microphone stack, where the transversal direction extends perpendicular to the main plane of extension of the display,
forming an elastic connector around the microphone stack, the elastic connector surrounding the microphone stack in lateral directions that extend parallel to the main plane of extension of the display, and
mounting the microphone stack with the elastic connector into the display, wherein the display surrounds the microphone stack at a distance and wherein the elastic connector mechanically connects the display to the microphone stack.

13. The method according to claim 12, wherein producing the microphone stack further comprises
providing an elastic layer,
providing a gasket with a plurality of through-holes penetrating the gasket and mounting the gasket in the transversal direction under the elastic layer, and
mounting the transducer array with the optical reading device in the transversal direction under the gasket with the elastic layer, wherein the membranes of the transducer array are aligned with the through-holes of the gasket.

14. The method according to claim 12, wherein the thin-film comprises a 2D material layer and the membranes of the transducer array are formed from respective portions of the 2D material layer.

* * * * *